C. J. BROWN.
RADIATOR PLUG.
APPLICATION FILED JUNE 16, 1920.
1,369,882.
Patented Mar. 1, 1921.
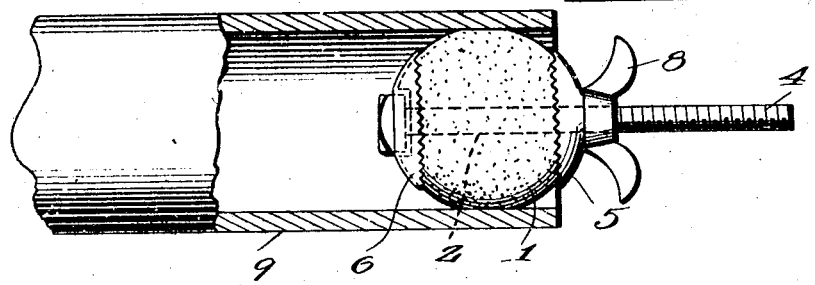
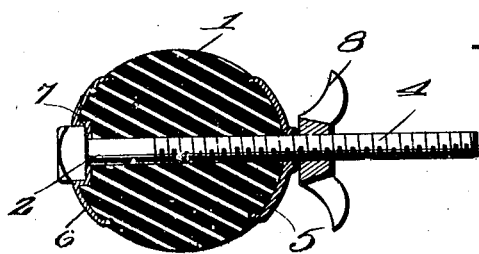
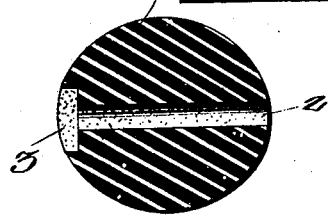
WITNESSES
INVENTOR
C. J. Brown,
BY
ATTORNEYS

UNITED STATES PATENT OFFICE.

CHARLES JAMES BROWN, OF HAMILTON, TEXAS.

RADIATOR-PLUG.

1,369,882.                    Specification of Letters Patent.    Patented Mar. 1, 1921.

Application filed June 16, 1920. Serial No. 389,462.

*To all whom it may concern:*

Be it known that I, CHARLES JAMES BROWN, a citizen of the United States, and a resident of Hamilton, in the county of Hamilton and State of Texas, have invented certain new and useful Improvements in Radiator-Plugs, of which the following is a specification.

My invention is an improvement in radiator plugs, and has for its object to provide a plug of the character specified, for sealing the tubes of radiators with a fluid-tight joint, thus permitting the usual sealing caps to be dispensed with.

In the drawings:—

Figure 1 is a partial section of a radiator tube with the plug in place,

Fig. 2 is a longitudinal section of the plug,

Fig. 3 is a similar view of the plug detached.

In the present embodiment of the invention, the improved plug comprises an expanding member 1 which is an elongated sphere, of rubber or like material, and this elongated sphere has at its long axis an opening 2 extending entirely through the same.

The opening is counter-sunk or reamed at one end as shown at 3, and the opening is designed to receive a bolt 4, the head engaging in the counter-sunk portion 3. Caps 5 and 6 are provided in connection with the elongated sphere, the cap 5 fitting over the end of the sphere remote from the counter-bore 3, while the cap 6 fits over the counter-bored end; each of the caps having a central opening, the opening of cap 5 being strengthened and protected by a neck or collar which projects beyond the outer surface of the cap and forms a seat against which a winged nut is adapted to abut.

This cap 6 has a depressed portion 7 shaped to fit the head of the nut, and to fit the counter-bore 3 of the sphere 1. The edges of the caps 5 and 6 are toothed as shown, to insure firm engagement with the sphere, and the teeth are bent slightly inward as shown more particularly in Fig. 2.

A wing nut 8 is threaded onto the bolt at the end adjacent to the cap 5, and it will be obvious that when this nut is turned in a direction to force the caps toward each other, the sphere 1 will be expanded in the direction of its short axis, to decrease the long axis and increase the short axis. The plug is introduced into the radiator tube indicated at 9 in the manner shown in Fig. 1.

That is, the wing nut is loosened to permit the sphere to assume its normal form. Now the sphere is introduced into the tube the required depth, preferably until the cap 5 is about flush with the end of the tube, and the wing nut is turned to force the caps toward each other. This expands the sphere 1, and forms a fluid-tight joint in the pipe.

In the usual method of sealing these tubes, a sealing cap of metal is soldered onto the pipe. This necessitates the threading of the pipe and the provision of the cap. With the improved plug the pipe may be sealed at any point desired, without the necessity for threading or for any changes whatever in the pipe.

I claim:—

1. A device of the character described comprising a spherical body of resilient material, caps disposed at opposite sides of said body, a bolt passing through said body and caps, and a clamping nut threaded on said bolt, said caps having their edges serrated and inturned for penetrating engagement with the body to prevent rotation of the caps.

2. A device of the character described comprising a spherical resilient body provided with a bore and a rectangular recess at one end of the bore, caps disposed against the body at the ends of the bore, one cap being formed centrally with a depressed portion defining a projection fitting within said recess, a bolt extending through said caps and said bore, the bolt having a head conformingly fitting within said depressed portion, and a clamping nut threaded upon said bolt.

3. A device as herein described, comprising an approximately spherical expansible body having a central bore, dished caps disposed at opposite ends of said body and having central openings alining with said bore, one of said caps having an outwardly projecting neck or collar surrounding its opening, a threaded bolt passing said caps and body, and a clamping nut threaded on said bolt and adapted to abut the aforesaid neck of the cap to force said caps toward each other and thus expand the body laterally.

CHARLES JAMES BROWN.